(12) United States Patent
Arman et al.

(10) Patent No.: US 6,502,404 B1
(45) Date of Patent: Jan. 7, 2003

(54) CRYOGENIC RECTIFICATION SYSTEM USING MAGNETIC REFRIGERATION

(75) Inventors: Bayram Arman, Grand Island, NY (US); Arun Acharya, East Amherst, NY (US); Dante Patrick Bonaquist, Grand Island, NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 09/917,702

(22) Filed: Jul. 31, 2001

(51) Int. Cl.[7] .............. F25B 21/00; F25J 3/00
(52) U.S. Cl. .............. 62/3.1; 62/643; 62/912
(58) Field of Search ............. 62/3.1, 643, 646, 62/912

(56) References Cited

U.S. PATENT DOCUMENTS

| | | | |
|---|---|---|---|
| 4,332,135 A | * | 6/1982 | Barclay et al. ............. 62/3.1 |
| 4,507,927 A | | 4/1985 | Barclay ..................... 62/3 |
| 4,589,953 A | | 5/1986 | Nakagome et al. ......... 156/645 |
| 5,156,003 A | | 10/1992 | Yoshiro et al. ............. 62/3.1 |
| 5,513,497 A | * | 5/1996 | Agrawal et al. ............ 62/651 |
| 5,887,449 A | | 3/1999 | Pecharsky et al. .......... 62/3.1 |
| 6,000,239 A | | 12/1999 | Bonaquist et al. ........... 62/646 |
| 6,053,008 A | * | 4/2000 | Arman et al. .............. 62/646 |
| 6,076,372 A | | 6/2000 | Acharya et al. ............ 62/606 |
| 6,112,550 A | * | 9/2000 | Bonaquist et al. .......... 62/646 |
| 6,205,812 B1 | | 3/2001 | Acharya et al. ............ 62/607 |

* cited by examiner

Primary Examiner—William C. Doerrler
(74) Attorney, Agent, or Firm—Stanley Ktorides

(57) ABSTRACT

A cryogenic rectification system wherein some or all of the refrigeration necessary to drive the rectification is generated by periodically magnetizing and demagnetizing a bed of magnetizable material, passing refrigerator gas through the bed to produce cold refrigerator gas, and passing refrigeration from the cold refrigerator gas into the rectification system.

9 Claims, 4 Drawing Sheets

CRYOGENIC RECTIFICATION SYSTEM USING MAGNETIC REFRIGERATION

TECHNICAL FIELD

This invention relates generally to cryogenic rectification and is particularly useful for carrying out cryogenic air separation.

BACKGROUND ART

Cryogenic rectification, such as the cryogenic rectification of feed air, requires the provision of refrigeration to drive the separation. Generally such refrigeration is provided by the turboexpansion of a process stream, such as, for example, a portion of the feed air. While this conventional practice is effective, it is limiting because any change in the requisite amount of refrigeration inherently affects the operation of the overall process. It is therefor desirable to have a cryogenic rectification system wherein the provision of the requisite refrigeration is independent of the flow of process streams for the system.

One method for providing refrigeration for a cryogenic rectification system which is independent of the flow of internal system process streams is to provide the requisite refrigeration in the form of cryogenic liquid brought into the system. Unfortunately such a procedure is very costly.

Accordingly it is an object of this invention to provide an improved cryogenic rectification system wherein the provision of at least some of the refrigeration for the separation is independent of the turboexpansion of process streams and does not require the provision of exogenous cryogenic liquid to the system.

SUMMARY OF THE INVENTION

The above and other objects, which will become apparent to those skilled in the art upon a reading of this disclosure, are attained by the present invention, one aspect of which is:

A method for carrying out cryogenic rectification comprising:

(A) passing feed into a cryogenic rectification plant comprising at least one column;

(B) magnetizing a bed of magnetizable particles to heat the magnetizable particles, heating refrigerator gas by contacting the refrigerator gas with the magnetized particles, cooling the heated refrigerator gas, demagnetizing the bed of magnetizable particles, and passing cooled refrigerator gas in contact with the demagnetized particles to produce cooled refrigerator gas containing refrigeration;

(C) passing refrigeration from the refrigerator gas into the cryogenic rectification plant; and (D) separating the feed by cryogenic rectification within the cryogenic rectification plant using refrigeration from the refrigerator gas.

Another aspect of the invention is:

Apparatus for carrying out cryogenic rectification comprising:

(A) a cryogenic rectification plant comprising at least one column and means for passing feed into the cryogenic rectification plant;

(B) a magnetic refrigerator comprising a bed of magnetizable particles, means for magnetizing and demagnetizing the bed of magnetizable particles, and means for passing refrigerator gas through the bed of magnetizable particles;

(C) means for passing refrigeration from the magnetic refrigerator into the cryogenic rectification plant; and (D) means for recovering product from the cryogenic rectification plant.

As used herein the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*.

The term "double column" is used to mean a higher pressure column having its upper portion in heat exchange relation with the lower portion of a lower pressure column. A further discussion of double columns appears in Ruheman "The Separation of Gases", Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the more volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein the term "indirect heat exchange" means the bringing of two fluids into heat exchange relation without any physical contact or intermixing of the fluids with each other.

As used herein the term "product nitrogen" means a fluid having a nitrogen concentration of at least 95 mole percent.

As used herein the term "product oxygen" means a fluid having an oxygen concentration of at least 85 mole percent.

As used herein the term "product argon" means a fluid having an argon concentration of at least 90 mole percent.

As used herein the term "feed air" means a mixture comprising primarily oxygen, nitrogen and argon, such as ambient air.

As used herein the terms "upper portion" and "lower portion" mean those sections of a column respectively above and below the mid point of the column.

DETAILED DESCRIPTION

Figure 1:
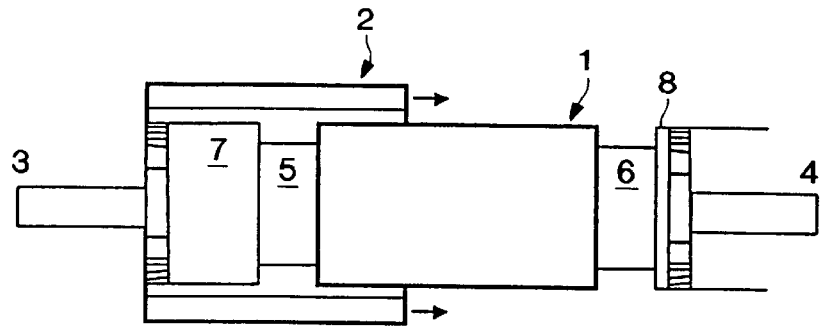
FIGS. 1–4 illustrate the operation of one embodiment of the magnetic refrigerator system useful in the practice of this invention.

The invention comprises in general the generation of refrigeration using a magnetic refrigerator system and the use of that refrigeration to provide cooling to a fluid which is processed in a cryogenic rectification plant. The cooling may involve an intermediate fluid to pass refrigeration from the magnetic refrigerator to that process fluid.

The invention will be described in greater detail with reference to the Drawings and wherein the cryogenic rectification is a cryogenic air separation system wherein feed air is separated by cryogenic rectification to produce at least one of product nitrogen, product oxygen and product argon.

Magnetic refrigeration operates on the magnetocaloric effect. The temperature of a bed of magnetic particles is changed with an applied magnetic field. The temperature result of applying a magnetic field to magnetic particles is extremely rapid. Magnetic materials are available that have essentially no magnetic losses. These features make the magnetic refrigeration cycle very efficient as long as the losses incurred in changing the applied magnetic field are minimized. This is accomplished by using particles that are very small, a feature that is also favorable to high heat transfer. Good heat transfer is carried out in the cycle by the used of refrigerator gas such as helium gas the heat transfer fluid to move the heat or refrigeration generated by the magnetic particles to the refrigerator gas.

The operation of one magnetic refrigerator system is shown in FIGS. 1–4. The system shown in FIG. 1–4 includes a porous granular magnetic bed 1, a moveable strongelectromagnetic or superconducting magnet 2, two pistons 3 and 4, and cold 5, and hot 6, heat exchangers, with pistons 3 and 4 connected to magnetic generator bed 1 through cold heat exchanger 5 and hot heat exchanger 6 respectively. The void space surrounding the magnetizable particles in bed 1 and the volumes in cylinders 7 and 8 are filled with helium gas under pressure. Magnetic bed 1 can be composed of a number of different magnetic materials, gadolinium nickel ($GdNi_2$), a ferromagnet, is one example. Other magnetizable materials which may be employed in the practice of this invention include, $GdZn_2$, $GdTiO_3$, $Gd_2Ni_{17}$, $GdAl_2$, $GdMg$, $GdCd$, $Gd_4CO_3$, $GdGa$, $Gd_5Si_4$ and $GdZn$.

Table 1 lists magnetic materials that are suitable for magnetocaloric service over a range of temperatures. A graded or layered bed of these materials could be used to reach a given temperature level.

TABLE 1

| Temperature Level | Magnetic Material |
|---|---|
| 260–315 K | $Gd_5(Si_{0.5}Ge0.5)_4$ |
| 230–280 K | $Gd_5(Si_{0.43}Ge_{0.57})_4$ |
| 130–185 K | $Gd_5(Si_{0.25}Ge_{0.75})_4$ |
| 60–90 K | $Gd_5(Si_{0.0825}Ge_{0.9175})_4$ |
| 10–50 K | $Gd_5Ge_4$ |

FIG. 1 shows the initial state of the system. At the beginning of the cycle described, cold heat exchanger 5 is initially at a low temperature, e.g. 40 K, and hot heat exchanger 6 is warmer at about 70 K. The strong magnet 2, at the left end of the system, is ready to be moved into position surrounding magnetic regenerator bed 1. Helium gas in cylinder 7 is ready to be displaced by piston 3 through the connecting system to the right. Piston 4 is situated at the left end of cylinder 8 having very little clearance volume for the helium gas at the outset. By moving the strong magnet 2 to the right the magnetic field surrounding magnetic regenerator bed 1 is increased.

Figure 2:
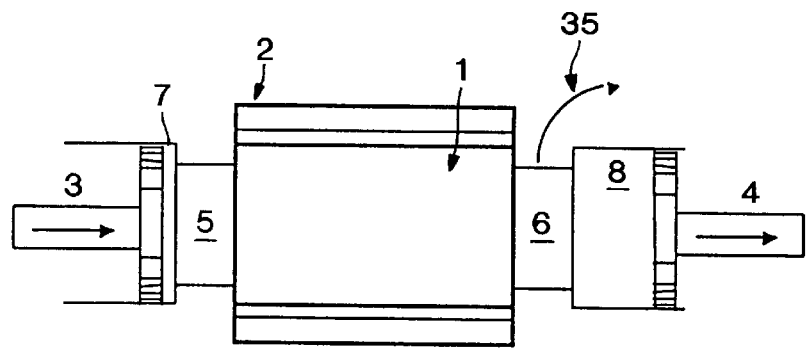

FIG. 2 shows the strong magnet 2 positioned around magnetic regenerator bed 1. The magnetocaloric effect causes each magnetic particle in magnetic regenerator bed 1 to warm slightly. Both pistons 3 and 4 are moved to their extreme right position thus causing the enclosed helium gas stream to flow from the left cylinder 7, through cold heat exchanger 5, magnetic regenerator bed 1 and hot heat exchanger 6 to fill increased cylinder 8 volume. The particles in bed 1 are cooled by the flowing gas and the gas in turn is warmed by the bed arriving at a temperature near to the temperature of bed 1 at the warm end. Heat is transferred 35 from the gas to a heat sink such as cooling water (not shown) as the gas flows through hot heat exchanger 6. The helium gas leaving bed 1 at the hot end will be at a higher temperature, e.g. 75 K.

Figure 3:
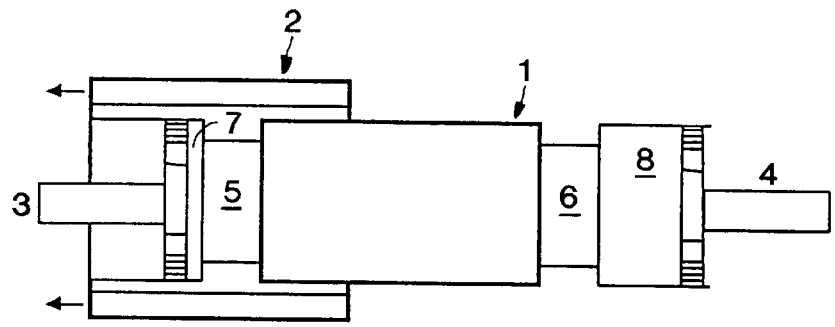
Figure 4:
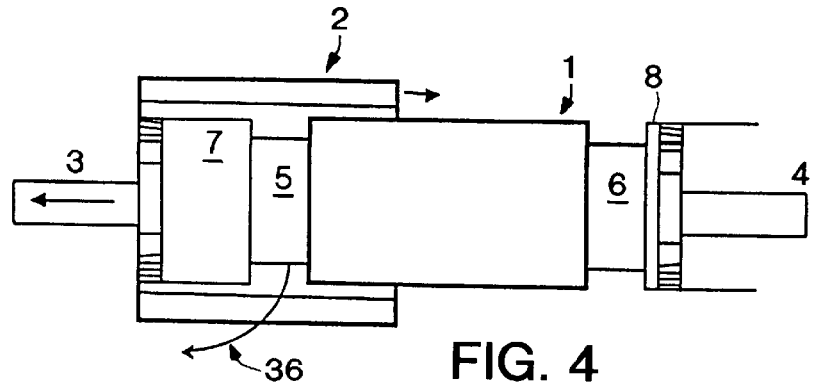

When the right piston 4 reaches its extreme right position, as shown in FIG. 3, the gas flow is stopped, and the magnetic field is removed by repositioning magnet 2 to the left end demagnetizing the bed particles. The cooling of bed 1 takes place by the magnetocaloric effect. The last step of the cycle is the travel of pistons 3 and 4 to their extreme left positions, as shown in FIG. 4. This causes the helium gas to flow from cylinder 8, through hot heat exchanger 6, magnetic regenerator bed 1, cold heat exchanger 5, and into cylinder volume 7. The helium is cooled by bed 1 leaving at a temperature below 40 K, permitting heat to be extracted 36 from a cold sink, such as a fluid processed in a cryogenic rectification plant, as the helium passes through cold heat exchanger Other configurations of a magnetic refrigerator which can be used in the practice of this invention include systems where the magnet turns around the bed, or systems using multiple beds as well as multiple magnets.

Figure 5:
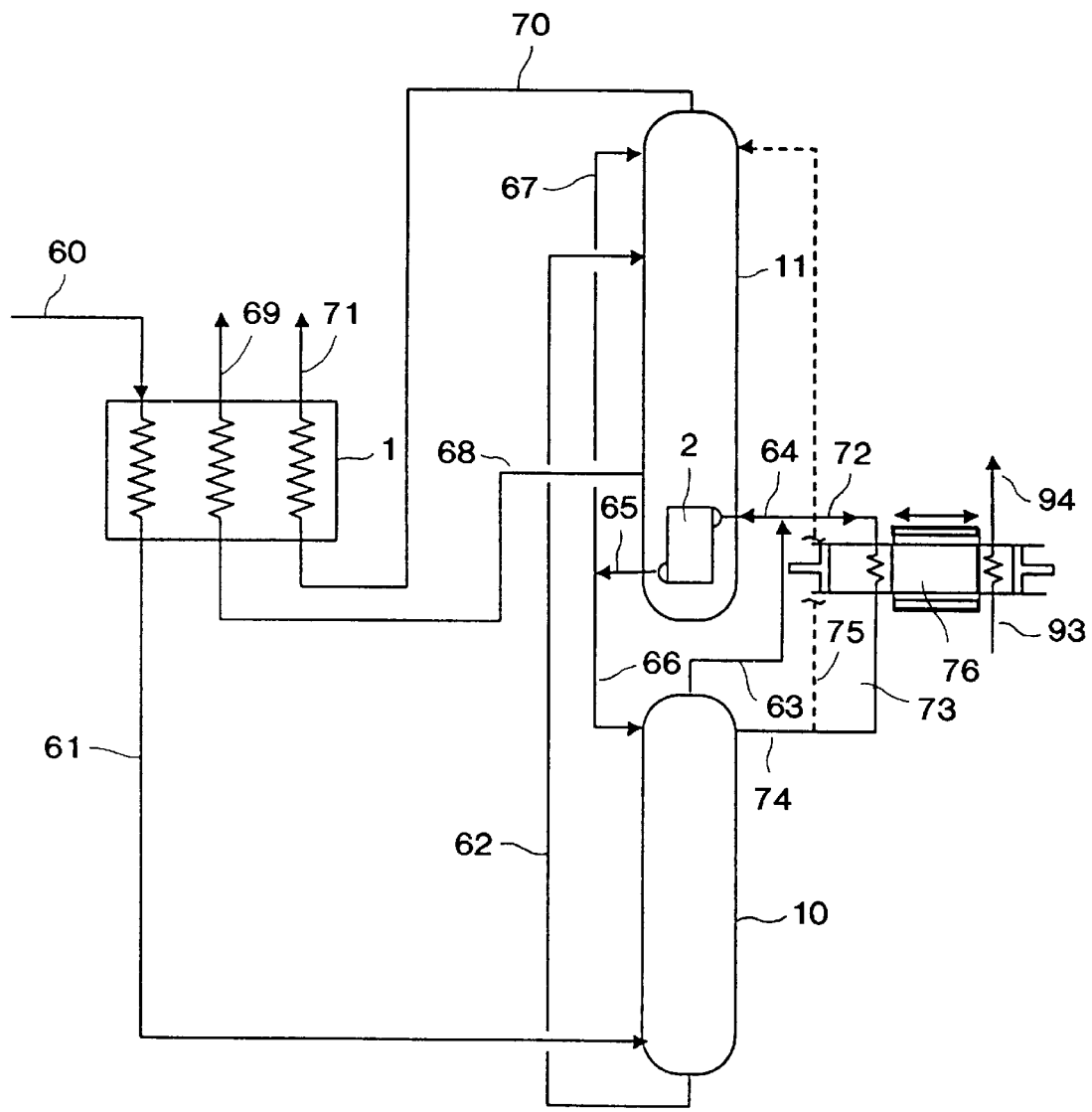
FIG. 5 is a schematic representation of one preferred embodiment of the invention wherein the cryogenic rectification plant is a double column air separation plant and refrigeration is passed from the magnetic refrigerator into the plant using higher pressure column shelf vapor.

Referring now to FIG. 5, feed air 60, which has been cleaned of high boiling impurities such as carbon dioxide, water vapor and hydrocarbons, is cooled by passage through main heat exchanger 1 by indirect heat exchange with return streams. Resulting cooled feed air 61 is passed into higher pressure column 10 which is part of a double column which also includes lower pressure column 11. Column 10 is operating at a pressure generally within the range of from 50 to 250 pounds per square inch absolute (psia). Within higher pressure column 10 the feed air is separated by cryogenic rectification into nitrogen-enriched vapor and oxygen-enriched liquid.

Oxygen-enriched liquid is withdrawn from the lower portion of column 10 in stream 62 and passed into lower pressure column 11. Nitrogen-enriched vapor is withdrawn from the upper portion of column 10 in stream 63 and, in the embodiment of the invention illustrated in FIG. 5, is divided into streams 64 and 72. Stream 64 is passed into main condenser 2 wherein it is condensed by indirect heat exchange with boiling lower pressure column bottom liquid. Resulting condensed nitrogen-enriched liquid is withdrawn from main condenser 2 in stream 65. A portion 66 of the nitrogen-enriched liquid is passed into the upper portion of column 10 as reflux and another portion 67 of the nitrogen-enriched liquid is passed into the upper portion of column 11 as reflux.

Lower pressure column 11 is operating at a pressure less than that of higher pressure column 10 and generally within the range of from 15 to 60 psia. Within lower pressure column 11 the fluids passed into that column are separated by cryogenic rectification to produce nitrogen-rich fluid and oxygen-rich fluid which may be recovered as product nitrogen and/or product oxygen respectively. In the embodiment illustrated in FIG. 5, nitrogen-rich vapor is withdrawn from the upper portion of column 11 in stream 70, warmed by passage through main heat exchanger 1, and recovered as product nitrogen in stream 71. Oxygen-rich vapor is withdrawn from the lower portion of column 11 in stream 68, warmed by passage through main heat exchanger 1, and recovered as product oxygen in stream 69.

At least some, and preferably all, of the refrigeration necessary to drive the cryogenic rectification within the column or columns is generated by magnetic refrigeration. If desired, additional refrigeration, such as from turboexpansion of a process stream or generated by another refrigeration system such as a Brayton cycle, could also be used to drive the cryogenic rectification within the column or columns. In the embodiment illustrated in FIG. 5, magnetic refrigerator 76 operates in a manner similar to that described in conjunction with FIGS. 1–4. The heat sink 93, 94 passing through the hot heat exchanger may be cooling water, ethylene glycol or some other fluid, and the cold sink is nitrogen-enriched vapor 72.

Nitrogen-enriched vapor stream 72 is passed in indirect heat exchange relation with the refrigerator gas in the cold heat exchanger of magnetic refrigerator system 76, whereby refrigeration is passed from the magnetic refrigeration system into the nitrogen-enriched vapor which is condensed and subcooled, as illustrated in FIG. 5. Resulting condensed nitrogen-enriched liquid 73 is passed into at least one, or both, of columns 10 and 11 thereby serving to pass refrigeration generated by the magnetic refrigeration system into the cryogenic rectification plant. In the embodiment of the invention illustrated in FIG. 5, the condensed nitrogen-enriched liquid in stream 73 is shown as being passed into the upper portion of column 10 as additional reflux in stream 74, and optionally into the upper portion of column 11 as additional reflux as illustrated by broken line 75.

If desired, when refrigeration from the magnetic refrigeration system is passed into a stream withdrawn from the cryogenic rectification plant, that stream need not be passed back into the plant but rather could be warmed by heat exchange with another stream which may be passed into the plant, thus passing refrigeration from the magnetic refrigeration system into the plant.

Figure 6:
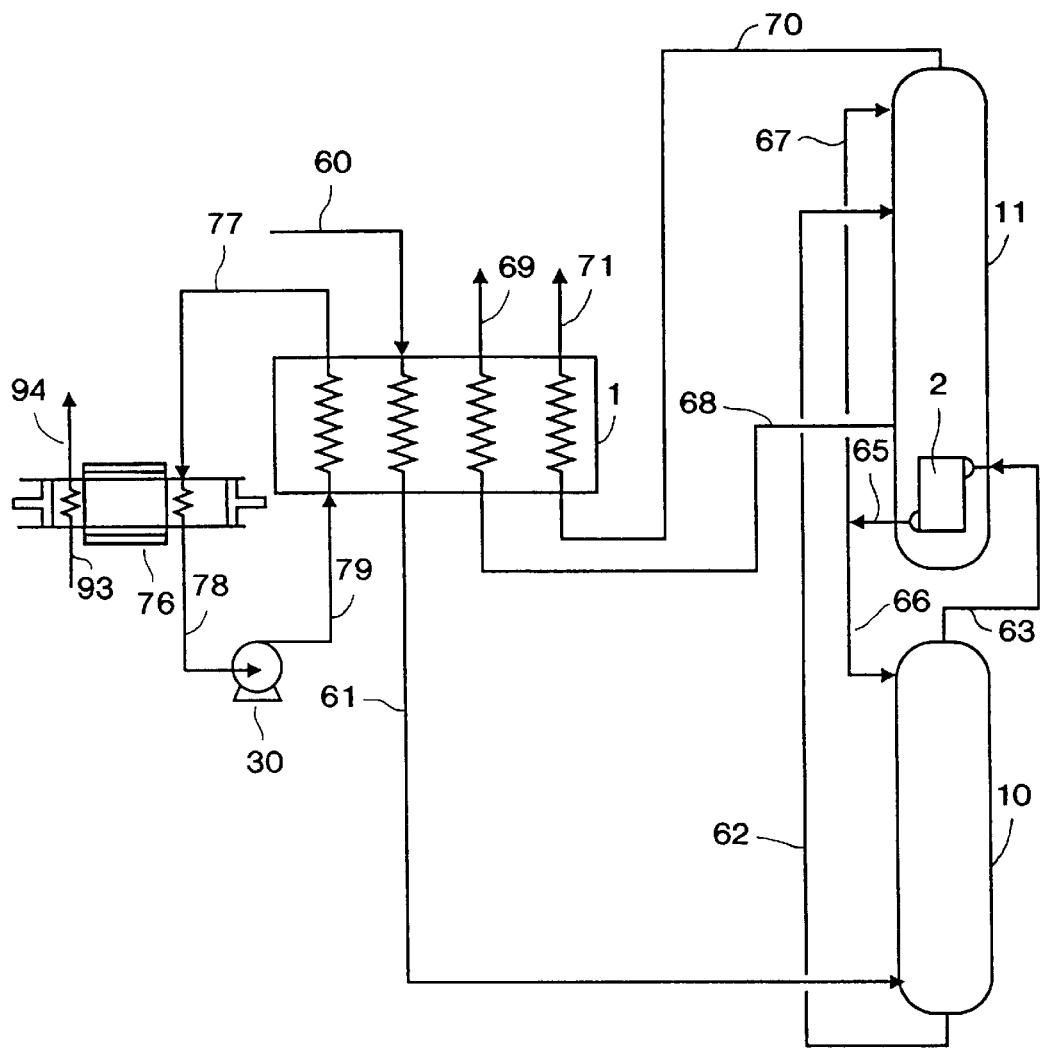
FIG. 6 is a schematic representation of another preferred embodiment of the invention wherein the cryogenic rectification plant is a double column air separation plant and refrigeration is passed from the magnetic refrigerator into the plant using the feed air.

FIG. 6 illustrates another embodiment of the invention wherein refrigeration generated by the magnetic refrigeration system is passed into the feed, in this case feed air, and with the feed this refrigeration is passed into the cryogenic rectification plant to drive the separation. In the embodiment of the invention illustrated in FIG. 6, nitrogen-enriched vapor stream 63 is passed into main condenser 2. Some of this nitrogen-enriched vapor stream 63 may be taken as a high pressure product after being warmed within primary heat exchanger 1. The numerals of FIG. 6 are the same as those of FIG. 5 for the common elements and these common elements will not be described again in detail.

Referring now to FIG. 6, heat exchange fluid in stream 77 is passed into indirect heat exchange relation with cold refrigerator gas in the cold heat exchanger of magnetic refrigeration system 76 whereby it is cooled by the passage of refrigeration from the magnetic refrigeration system into the heat exchange fluid. Examples of useful heat exchange fluids include helium, neon, nitrogen, argon, krypton, xenon, carbon tetrafluoride, fluorocarbons, fluoroethers and mixtures comprising one or more thereof. Resulting cooled heat exchange fluid 78 is pumped through pump 30 and as stream 79 is passed into main heat exchanger 1 wherein it is warmed by indirect heat exchange with feed air 60. In this way refrigeration generated by the magnetic refrigeration system is passed into the feed air and then into the cryogenic air separation plant. The feed air 61, which has been cooled and may be partially condensed by the indirect heat exchange both with the return streams and with the heat exchange fluid, is then passed into column 10 for processing as was previously described. Resulting warmed heat exchange fluid 77 is recycled from main heat exchanger 1 to the cold heat exchanger of magnetic refrigerator 76.

Figure 7:
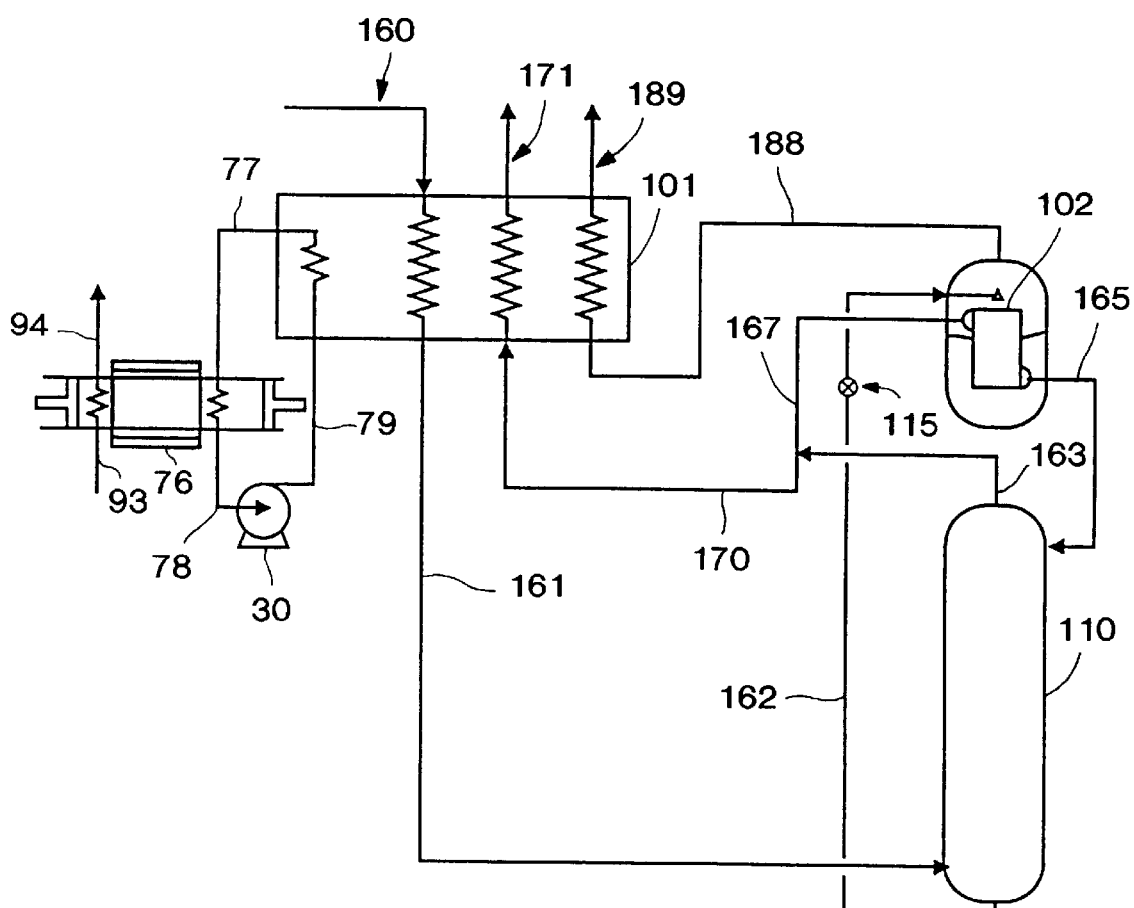
FIG. 7 is a schematic representation of another preferred embodiment of the invention wherein the cryogenic rectification plant is a single column air separation plant and refrigeration is passed from the magnetic refrigerator into the plant using the feed air.

FIG. 7 illustrates the operation of the invention in conjunction with a single column cryogenic rectification plant. The particular system illustrated in FIG. 7 is a single column cryogenic air separation plant for the production of product nitrogen.

Referring now to FIG. 7, feed air 160, which has been cleaned of high boiling impurities such as carbon dioxide, water vapor and hydrocarbons, is cooled by passage through main heat exchanger 101 by indirect heat exchange with return streams and with heat exchange fluid. Resulting cooled feed air 161 is passed into column 110 which is operating at a pressure generally within the range of from 50 to 250 (psia). Within column 110 the feed air is separated by cryogenic rectification into nitrogen-enriched vapor and oxygen-enriched liquid.

Oxygen-enriched liquid is withdrawn from the lower portion of column 110 in stream 162 and passed through valve 115 and into top condenser 102. Nitrogen-enriched vapor is withdrawn from the upper portion of column 110 in stream 163 and is divided into streams 170 and 167. Stream 167 is passed into top condenser 102 wherein it is condensed by indirect heat exchange with the oxygen-enriched liquid. Resulting condensed nitrogen-enriched liquid is passed from top condenser 102 in stream 165 as reflux into the upper portion of column 110. Stream 170 is warmed by passage through main heat exchanger 101 and recovered as product nitrogen in stream 171. Oxygen-enriched vapor which results from the heat exchange in top condenser 102 is withdrawn as stream 188, warmed by passage through main heat exchanger 101, and removed from the system in stream 189.

Refrigeration generated by the magnetic refrigeration system is passed into the feed air and, with the feed air into the cryogenic rectification plant in a manner similar to that described in conjunction with FIG. 6. The numerals for the magnetic refrigeration cycle illustrated in FIG. 7 are the same as those used in FIG. 6, and a description of the operation of the cycle will not be repeated.

Although the invention has been described in detail with reference to certain preferred embodiments, those skilled in the art will recognize that there are other embodiments of the invention within the spirit and the scope of the claims. For example many other cryogenic air separation plant arrangements can be used with the invention such as, for example, a double column with an argon sidearm column wherein product argon is produced. Also, the refrigeration generated by the magnetic refrigeration system could be passed into different process streams from those illustrated in the Drawings. Furthermore, although the Drawings illustrate systems wherein the magnetic refrigeration is passed into a process stream using either no intermediate heat exchange or one intermediate heat exchange step, more than one intermediate heat exchange step may also be employed for this purpose.

What is claimed is:

1. A method for carrying out cryogenic rectification comprising:
   (A) passing feed into a double column cryogenic rectification plant comprising a higher pressure column and a lower pressure column;
   (B) magnetizing a bed of magnetizable particles to heat the magnetizable particles, heating refrigerator gas by contacting the refrigerator gas with the magnetized particles, cooling the heated refrigerator gas, demagnetizing the bed of magnetizable particles, and passing cooled refrigerator gas in contact with the demagnetized particles to produce cooled refrigerator gas containing refrigeration;
   (C) withdrawing vapor from the higher pressure column, condensing the withdrawn vapor by indirect heat exchange with cooled refrigerator gas, and passing the resulting condensed liquid into at least one of the higher pressure column and the lower pressure column; and
   (D) separating the feed by cryogenic rectification within the cryogenic rectification plant using refrigeration from the refrigerator gas.

2. Apparatus for carrying out cryogenic rectification comprising:
   (A) a double column cryogenic rectification plant comprising a higher pressure column and a lower pressure column having a main condenser, and means for passing feed into the cryogenic rectification plant
   (B) a magnetic refrigerator comprising a bed of magnetizable particles, means for magnetizing and demagnetizing the bed of magnetizable particles, and means for passing refrigerator gas through the bed of magnetizable particles
   (C) means for passing vapor from the higher pressure column to the magnetic refrigerator and means for passing liquid from the magnetic refrigerator into at least one of the higher pressure column and the lower pressure column; and
   (D) means for recovering product from the cryogenic rectification plant.

3. The method of claim 1 wherein the withdrawn vapor is divided into two streams, one of the streams is condensed by indirect heat exchange with lower pressure column liquid, and the other stream is the said withdrawn vapor condensed by indirect heat exchange with the cooled refrigerator gas.

4. The method of claim 1 wherein the condensed liquid is also subcooled by the indirect heat exchange with the cooled refrigerator gas.

5. The method of claim 1 wherein the condensed liquid is passed into the higher pressure column.

6. The method of claim 1 wherein the condensed liquid is passed into both the higher pressure column and the lower pressure column.

7. The apparatus of claim 2 further comprising means for passing vapor from the higher pressure column to the main condenser.

8. The apparatus of claim 2 further comprising means for passing liquid from the magnetic refrigerator into both the higher pressure column and the lower pressure column.

9. The method of claim 1 wherein substantially all of the refrigeration required to carry out the cryogenic rectification is refrigeration from the refrigerator gas.

* * * * *